United States Patent

[11] 3,622,358

| [72] | Inventors | Tsunehiko Yoshioka;<br>Hishashi Sato; Naoki Suda, all of Akita-ken, Japan |
|---|---|---|
| [21] | Appl. No. | 778,415 |
| [22] | Filed | Nov. 25, 1968 |
| [45] | Patented | Nov. 23, 1971 |
| [73] | Assignee | TDK Electronics Co., Ltd.<br>Tokyo, Japan |
| [32] | Priority | Aug. 29, 1968 |
| [33] | | Japan |
| [31] | | 43/61465 |

[54] CERAMIC DIELECTRIC COMPOSITIONS
1 Claim, 4 Drawing Figs.

[52] U.S. Cl. .................................................. 106/39 R, 106/46
[51] Int. Cl. ............................................................. C04b 35/46
[50] Field of Search .......................................... 106/46, 39; 252/63.5

[56] References Cited
UNITED STATES PATENTS

| 2,220,774 | 11/1940 | Navias.......................... | 106/39 |
| 3,427,173 | 2/1969 | Fujiwaya et al............. | 106/39 |
| 3,431,124 | 3/1969 | Hayashi et al. .............. | 106/39 |
| 3,440,067 | 4/1969 | Fujiwara et al. ............. | 106/39 |

FOREIGN PATENTS

| 1,134,783 | 11/1968 | Great Britain................ | 106/39 |

*Primary Examiner*—Robert D. Edmonds
*Attorney*—Wenderoth, Lind & Ponack

ABSTRACT: The ceramic dielectric materials of the present invention consist of a ternary solid solution $CaTiO_3$-$PbTiO_3$-$La_2O_3\cdot_2$ and $CaTiSiO_5$, a part of which forms a solid solution with the said ternary system. The said ceramic materials are suitable as temperature compensating capacitors.

CERAMIC DIELECTRIC COMPOSITIONS

The present invention relates to ceramic dielectric materials suitable for use as temperature compensating capacitors.

The well known system $CaTiO_3$-$CaTiSiO_5$, an equimolar mixture in which the components form separate domains without forming a solid solution, exhibits typically the following characteristics: $\epsilon=82$; $Q=2,500$ and $T.C.=\pm0$ p.p.m./°C. Because of the fact that they do not form a solid solution, it is not feasible to obtain a Q-value higher than 2,500 and, moreover, it is necessary to keep the firing temperature within a narrow range to achieve sufficient maturity.

It is the fundamental object of the present invention to provide ceramic dielectric materials having high Q-values of about 5,000, demanding less severe firing conditions and applicable as temperature compensating capacitors. Such materials can be obtained by the combination of $CaTiSiO_5$ and a solid solution consisting of 45 to 95 mol percent of $CaTiO_3$, 1 to 40 mol percent of $PbTiO_3$ and 1 to 20 mol percent of $La_2O_3 \cdot 2TiO_2$.

In the present invention, the proportion of $CaTiSiO_5$ is purposely rather large so that a part of it forms a solid solution with the system $CaTiO_3$-$PbTiO_3$-$La_2O_3 \cdot 2TiO_2$, thus leading to a system consisting of two separate phases $CaTiSiO_5$ and $CaTiO_3$-$PbTiO_3$-$La_2O_3 \cdot 2TiO_2$-$CaTiSiO_5$. It should be noted that in the systems $CaTiSiO_5$-$CaTiO_3$-$PbTiO_3$ or $CaTiSiO_5$-$CaTiO_3$-$La_2O_3 \cdot 2TiO_2$, $CaTiSiO_5$ does not form a solid solution with the other components. Therefore, it is of essential importance that both $PbTiO_3$ and $La_2O_3 \cdot 2TiO_2$ be included.

In making a ceramic composition according to this invention, the raw materials are first presintered and ground to a fine powder separately. Calcium titanate-silicate ($CaTiSiO_5$), calcium titanate ($CaTiO_3$) and lanthanum titanate ($La_2O_3 \cdot 2TiO_2$) are presintered at or below 1,250° C. in an oxidizing atmosphere while lead titanate ($PbTiO_3$) is presintered at or below 900° C. also in an oxidizing atmosphere. After cooling, each of the presintered materials is ground to a fine powder, and then the several powders are mixed according to desired composition. To the mix, there is added a suitable binding agent, e.g., polyvinyl alcohol, the mixture pressed into shape and then fired to maturity at a temperature of 1,250° to 1,300° C. in an oxidizing atmosphere.

The present invention is characterized by a solid solution of the following composition:

| | |
|---|---|
| $CaTiO_3$ | 45 to 95 mol percent |
| $PbTiO_3$ | 1 to 40 mol percent |
| $La_2O_3 \cdot 2TiO_2$ | 1 to 20 mol percent | to which is added $CaTiSiO_5$, a part of which forms a solid solution with the said ternary solid solution.

Referring to the accompanying drawings:

D, E and F in the ternary diagram of FIG. 4.

It is necessary to control the amount of $CaTiSiO_5$ included in the solid solution $CaTiSiO_5$-$CaTiO_3$-$PbTiO_3$-$La_2O_3 \cdot 2TiO_2$ to achieve favorable dielectric and ceramic properties. It is somewhat difficult to restrict the overall amount of $CaTiSiO_5$ uniquely on the basis of dielectric characteristics but since, in a certain range, the characteristics can be kept constant over a range of $CaTiSiO_5$ amount by controlling the composition $CaTiO_3$-$PbTiO_3$-$La_2O_3 \cdot 2TiO_2$, it is advantageous to limit the amount of $CaTiSiO_5$ to a range from 40 to 85 mol percent. When the amount exceeds 85 mol percent, it becomes difficult to fire the mixture to maturity.

The proportion of $CaTiSiO_5$ included as an ingredient of the solid solution $CaTiSiO_5$-$CaTiO_3$-$PbTiO_3$-$La_2O_3 \cdot 2TiO_2$ can be controlled by means of adjusting the amount of $La_2O_3 \cdot 2TiO_2$. In the solid solution $CaTiO_3$-$PbTiO_3$-$La_2O_3 \cdot 2TiO_2$, the amount of $La_2O_3 \cdot 2TiO_2$ cannot exceed 20 mol percent. The inclusion of $PbTiO_3$ in excess of 40 mol percent results in poor reproducibility of dielectric characteristics due to irreproducible loss of $PbTiO_3$ caused by vaporization in the process of firing.

For the better understanding of the present invention, some examples are given in the following.

EXAMPLE 1

Presintered materials of chemical pure grade, according to the following proportion by weight:

| | mol % |
|---|---|
| $CaTiSiO_5$ | 70 |
| $CaTiO_3$ | 21 |
| $PbTiO_3$ | 6 |
| $La_2O_3 \cdot 2TiO_2$ | 3 | are milled together to achieve a thorough mixing, then polyvinyl alcohol is added as a binder, the mixture pressed into desired shape and then fired to maturity at a temperature of 1,250° to 1,300° C. in oxidizing atmosphere (air).

The ceramic body thus produced exhibits the following characteristics:

| | |
|---|---|
| Dielectric constant ($\epsilon$) | 73 |
| Temperature coefficient of dielectric constant ($-30 \sim +85°$ C.) | $-150$ p.p.m.° C. |
| Q-value | 5,000 | measured at 1 MC's, 25° C.

The dielectric characteristics of a number of different compositions according to the present invention produced by the procedures described in the above example are shown in the following tabulation. The measurements were made at 1 mc./s.

TABLE

| Specimen No. | Composition (mol percent) | | | | Characteristics | | |
|---|---|---|---|---|---|---|---|
| | $CaTiSiO_3$ | $CaTiO_3$ | $PbTiO_3$ | $La_2O_3 \cdot 2TiO_2$ | Dielectric constant at 25° C. | Q-value at 25° | Temperature coefficient, p.p.m./° C. |
| 1 | 75 | 17.5 | 5 | 2.5 | 68 | 5,000 | $-80$ |
| 2 | 80 | 14 | 4 | 2 | 66 | 4,900 | $-22$ |
| 3 | 85 | 10.5 | 3 | 1.5 | 57 | 4,800 | 80 |

Figure 1:
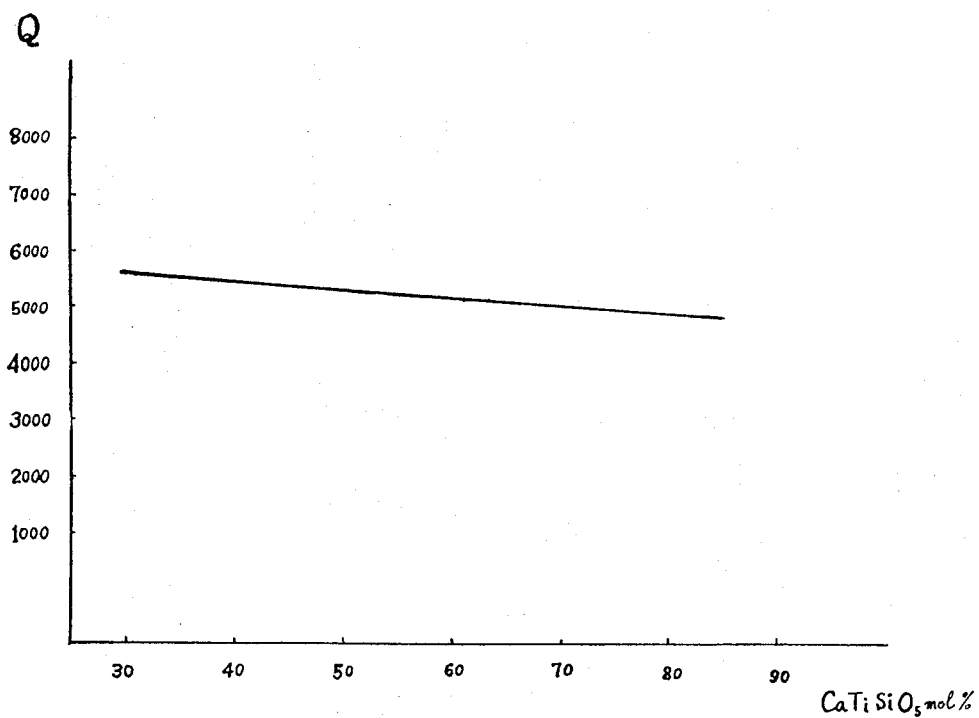
FIGS. 1 to 3 show respectively how the Q-value (Q), the dielectric constant ($\epsilon$) and the temperature coefficient of the dielectric constant (T.C.) of the ceramic composition of the present invention consisting of $CaTiSiO_5$, $CaTiO_3$, $PbTiO_3$ and $La_2O_3 \cdot 2TiO_2$ vary as the proportion of $CaTiSiO_5$ is varied.
Figure 2:
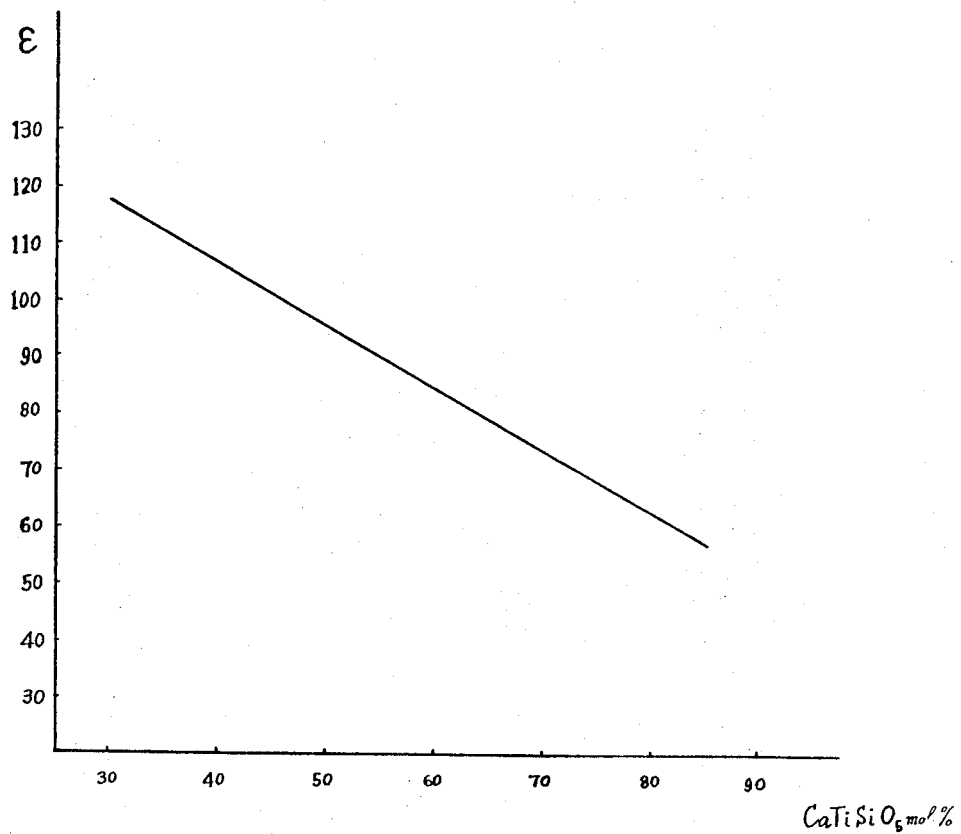
Figure 3:
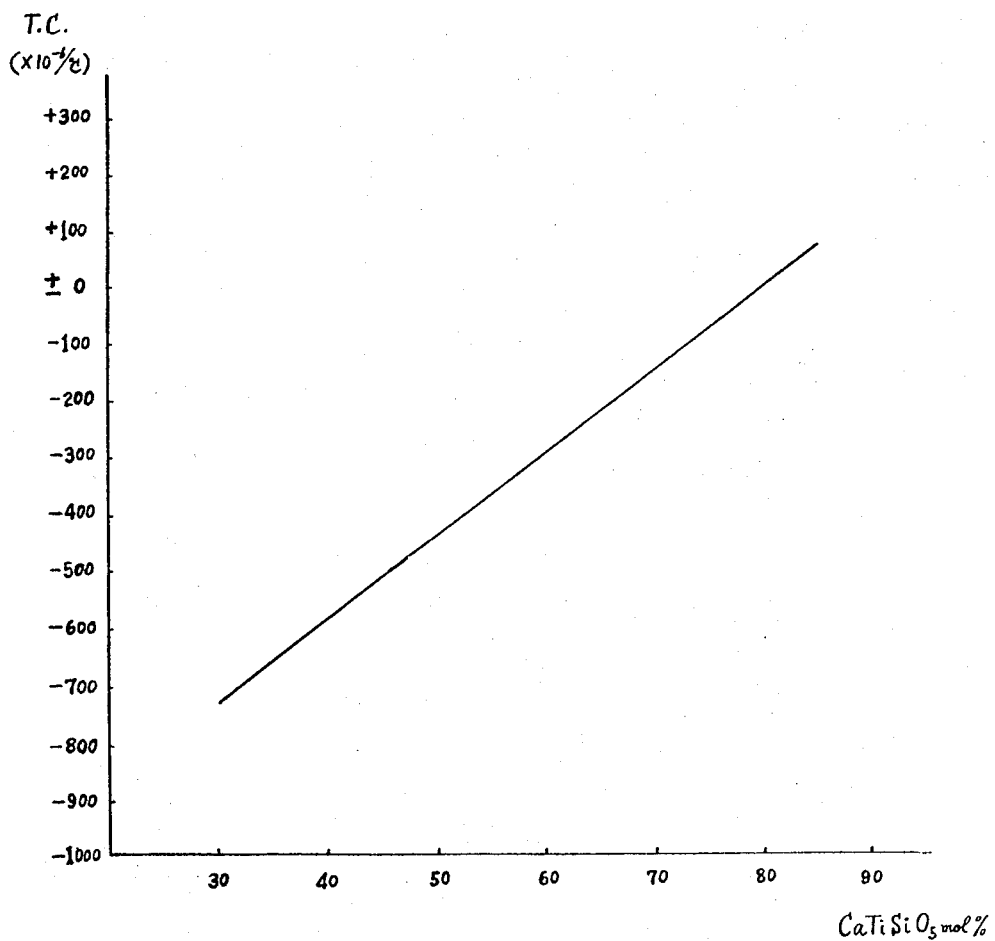
Figure 4:
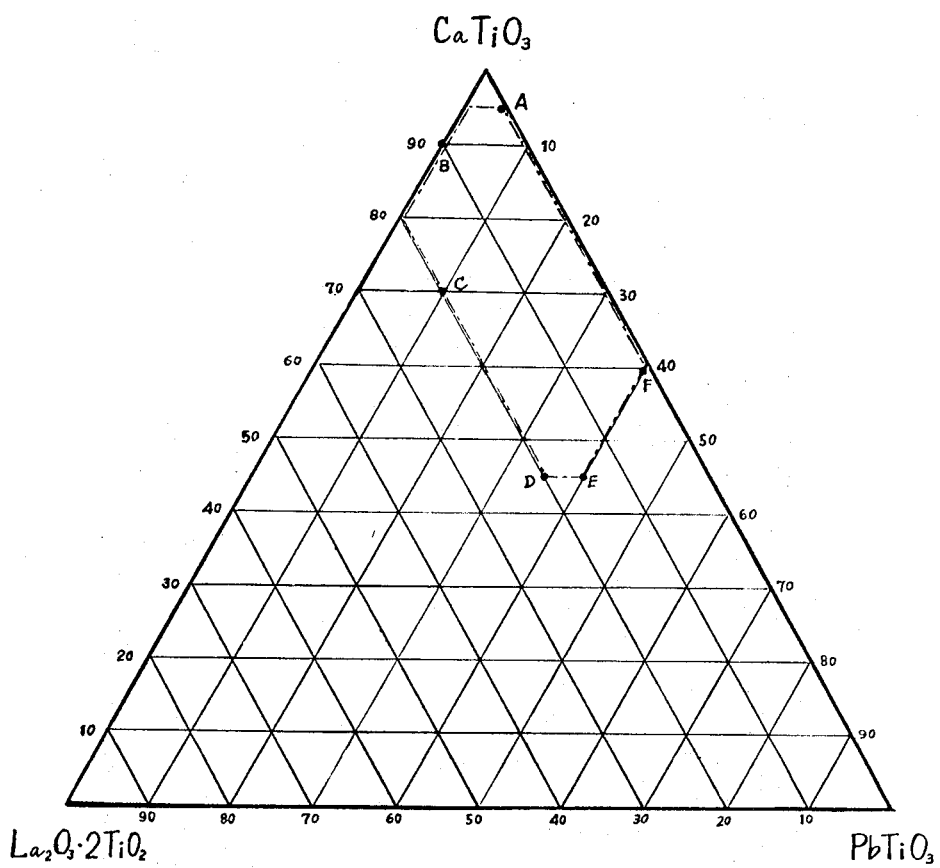
FIG. 4 shows a ternary diagram with the end members being $CaTiO_3$, $PbTiO_3$ and $La_2O_3 \cdot 2TiO_2$.

Referring to the basic solid solution $CaTiO_3$-$PbTiO_3$-$La_2O_3 \cdot 2TiO_2$, desirable electric properties are obtained by a composition belonging to the range enclosed by the points A, B, C,

What is claimed is:

1. A ceramic dielectric material useful for temperature compensating capacitors consisting of a ternary system $CaTiO_3$-$PbTiO_3$-$La_2O_3 \cdot 2TiO_3$ and $CaTiSiO_5$ in an amount between 40 and 85 mol percent the said ternary system consisting of 45 to 95 mol percent $CaTiO_3$, 1 to 40 mol percent $PbTiO_3$ and 1 to 20 mol percent $La_2O_3 \cdot 2TiO_2$.

* * * * *